United States Patent [19]

Banker

[11] Patent Number: 5,190,831
[45] Date of Patent: * Mar. 2, 1993

[54] BONDED TITANIUM/STEEL COMPONENTS

[75] Inventor: John G. Banker, Boulder, Colo.

[73] Assignee: Explosive Fabricators, Inc., Colo.

[*] Notice: The portion of the term of this patent subsequent to May 28, 2008 has been disclaimed.

[21] Appl. No.: 788,088

[22] Filed: Nov. 5, 1991

[51] Int. Cl.⁵ ............................................. B32B 15/00
[52] U.S. Cl. ................................... 428/660; 428/677; 428/940
[58] Field of Search ............... 428/660, 677, 679, 940; 228/107

[56] References Cited

U.S. PATENT DOCUMENTS

| | | | |
|---|---|---|---|
| 2,985,955 | 5/1961 | Rostoker et al. | 428/660 |
| 3,015,885 | 1/1962 | McEuen et al. | 428/660 |
| 3,689,232 | 9/1972 | Baba | 428/651 |
| 3,854,891 | 12/1974 | Chivinsky | 428/660 |
| 4,010,965 | 3/1977 | Izuma et al. | 228/107 |
| 4,612,259 | 9/1986 | Ueda | 428/660 |
| 4,839,242 | 6/1989 | Murayama et al. | 428/660 |

FOREIGN PATENT DOCUMENTS

| | | | |
|---|---|---|---|
| 2512369 | 3/1983 | France | 228/107 |
| 42-1846 | 1/1967 | Japan | 228/107 |
| 49-15333 | 4/1974 | Japan | 228/107 |
| 53-10347 | 1/1978 | Japan | 228/107 |
| 1-313193 | 12/1989 | Japan | 228/107 |
| 2-295682 | 12/1990 | Japan | 228/107 |

*Primary Examiner*—John Zimmerman
*Attorney, Agent, or Firm*—Richard W. Hanes

[57] ABSTRACT

A three-layered explosion bonded metal product comprising a layer of steel, a layer of titanium and an interlayer of 70-30 copper-nickel between the layer of steel and the layer of titanium. A method using explosive force is provided for bonding the three layers.

4 Claims, 1 Drawing Sheet

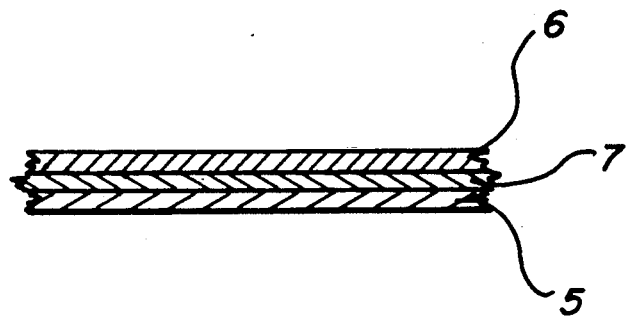
Fig_1
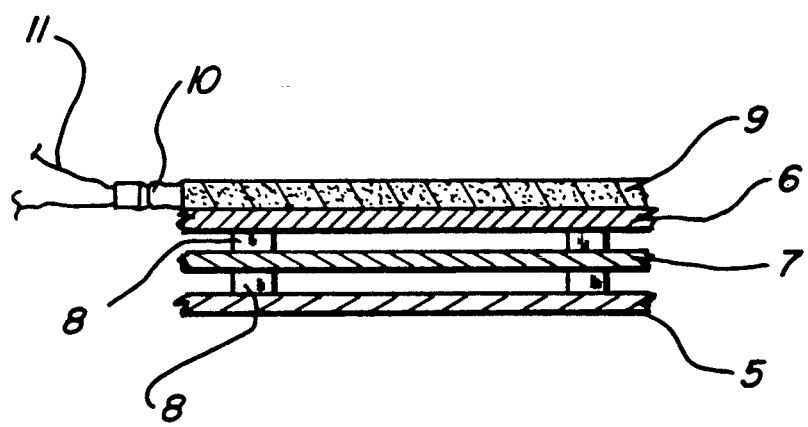
Fig_2

BONDED TITANIUM/STEEL COMPONENTS

BACKGROUND OF THE INVENTION

The invention relates to explosion bonded multilayered components which comprise titanium bonded to steel using a copper-nickel interlayer and the method of making the multilayered component.

In the past, it has not been possible to directly join titanium and steel using conventional fusion welding, due to the formation of brittle intermetallics in the weld metal. Explosion bonding has been used to cold weld titanium to steel, however, the bond produced by the direct bonding between steel and titanium does not exhibit good fracture toughness. Thus, if sufficient stress is concentrated in the titanium/steel bond zone to initiate fracture, brittle catastrophic failure of the transition joint can occur. Although this deficiency is not fully understood, the prevailing hypothesis is that the poor bond properties result from a significant atomic spacing mismatch between titanium and steel. U.S. Pat. No. 4,612,259 to Ueda discloses the simultaneous use of two interlayers, first tantalum or niobium, and then copper, nickel, or copper-nickel, between titanium and steel to improve bond toughness of bonded and subsequently hot rolled clad. Both tantalum and niobium are very expensive and limit the practicality of the disclosed product.

Copper and nickel interlayers between titanium and steel have also been used to improve bond toughness. However, the use of copper and nickel does not produce a bond toughness equivalent to that of the tantalum family, and thus the use of either metal is not as effective.

It is therefore an object of the instant invention to provide an improved titanium/steel transition joint with superior bond toughness.

It is a further object of the instant invention to provide a multilayered metal component with improved bond fracture toughness.

It is a further object of the instant invention to provide a method for forming a improved multilayered titanium/steel product utilizing explosive force.

SUMMARY OF THE INVENTION

A transition joint is provided between titanium and steel comprising an interlayer of 70-30 copper-nickel to enhance bond fracture toughness. An explosion bonded multilayered component is also provided comprising titanium bonded to steel with a copper-nickel interlayer.

To form the bonded multilayered component, an explosive bonding method is utilized comprising the steps of providing a layer of steel, spacing a layer of copper-nickel over the layer of steel, spacing a layer of titanium over the layer of copper-nickel, and applying an explosive force to metallurgically bond the three layers together to form a multilayered metal component.

BRIEF DESCRIPTION OF THE DRAWINGS

FIG. 1 is a partial cross-sectional view showing a three-layered composite product made in accordance with the instant invention.

FIG. 2 is a cross-sectional view illustrating a portion of the assembly used to make the three-layered composite product.

DETAILED DESCRIPTION OF THE INVENTION

FIG. 1 shows in partial cross-section the preferred example of the multilayered product. Layer 5 is a layer of steel. The steel component, layer 5, can also be selected from any of the common engineering alloys that are referred to as steel or that are readily compatible with steel. These include iron, nickel, chromium based alloys, or combinations of the three, such as carbon steels, low alloy steels, stainless steels, and nickel alloys.

Layer 6 is a layer of titanium. The layer can be of pure titanium or a titanium alloy. It is preferable the titanium alloy be over 73% by weight of titanium. The titanium provides good thermal resistance to about 1000° F.

Interlayer 7 between the titanium steel is copper-nickel (65-75% copper, 35-25% nickel). In the preferred example, 70-30 copper-nickel (70% copper, 30% nickel) is used, although the ratio can vary. For enhanced bond strength, at least 20% nickel is preferable. The copper-nickel provides a tough interface with both titanium and steel and enhances bond fracture toughness. The bond produced by the copper-nickel interlayer is tougher than that produced by unalloyed copper and nickel and is substantially equal to the bond produced using the tantalum family as the interlayer.

The use of copper-nickel is cheaper than the use of the tantalum family of metals and copper-nickel is more readily available in larger sizes. Also, the copper-nickel is not susceptible to hydrogen embrittlement.

The multilayered bonded product described above can be used as a transition joint, as bonded plate, or as bonded cylinders.

FIG. 2 illustrates the apparatus for performing the process for forming the composite metal. The copper-nickel interlayer 7 of the transition joint is placed on the steel plate 5. Spacers 8 are used to separate the layers 5 and 7. The titanium layer 6 of the transition joint is placed on the copper-nickel layer 7 with spacers 8 therebetween.

Explosive material 9 is placed on top of layer 10 to clad or bond the metals together. The explosive material 9 is ignited by an electric blasting cap 10 having lead wires 11 connected to a source of electricity. The force of the resulting explosion clads or bonds the metal layers together into a resultant composite product metal.

The spacers between the metal layers can be of various materials, although foamed plastic is preferred. The metal layers can be arranged horizontally as shown, or they can be set on end. The explosive material can be applied to the outer surface of either of the outermost layers.

It is further noted that the thickness of the outermost layers and interlayer can be selected to achieve the desired end product and are not critical in the explosive bonding.

The explosion cladding process produces an electron sharing, metallurgical bond. Prior to bonding, the plate surfaces are polished to remove visual contamination. During bonding, immediately preceding the collision point, the extreme surface pressure created by the impact produces a jetting action which strips away remaining surface contaminants. The jet cleaning action is immediately followed by the collision, generating bonding pressures of several million psi. The bonding action is completed in less than a millisecond, not allowing time for heat transfer and deleterious melting. The atomically clean surfaces and very high pressure result in an electron sharing bond, metallurgically similar to a grain boundary. A wavy appearing bond zone, resulting from the high velocity, high pressure collision of the metal elements, is characteristic of the explosion bonded composite.

Although the invention has been described with particular reference to explosive bonding, it is also noted that other well known methods of bonding, such as diffusion bonding and roll bonding, could also be used.

It is claimed:

1. An explosion bonded three-layered metal product comprising:
    a first layer of steel,
    a second layer of copper-nickel adjacent said steel layer, said layer of copper-nickel comprising copper in a range from 65% to 75% and nickel in a range from 35% to 25%, and
    a layer of titanium adjacent said layer of copper-nickel,
    a layer of titanium adjacent said layer of copper-nickel, wherein said bonded three-layered product exhibits superior bond toughness.

2. A transition joint between titanium and steel in an explosion bonded metal product, comprising an interlayer of copper-nickel between the titanium and steel, said interlayer of copper-nickel comprising copper in a range from 65 to 75 percent, and nickel in a range from 35 to 25 percent, wherein said transition joint exhibits superior bond toughness.

3. An explosion bonded three-layered metal product consisting essentially of
    a first layer of steel,
    a second layer of copper-nickel adjacent said steel layer, said copper-nickel consisting essentially of copper in a range from 65% to 75% and nickel in a range from 35% to 25%, and
    a layer of titanium adjacent said layer of copper-nickel.

4. A transition joint between titanium and steel in an explosion bonded metal product, consisting essentially of an interlayer of copper-nickel between the titanium and steel, said interlayer of copper-nickel consisting essentially of copper in a range from 65% to 75%, and nickel in a range from 35% to 25%.

* * * * *